US012560445B2

(12) United States Patent
Batie et al.

(10) Patent No.: US 12,560,445 B2
(45) Date of Patent: Feb. 24, 2026

(54) METHODS, SYSTEMS, AND VEHICLES FOR DYNAMIC ROUTING

(71) Applicant: Toyota Motor North America, Inc., Plano, TX (US)

(72) Inventors: Joshua Batie, Frisco, TX (US); Imad Zahid, Carrollton, TX (US); Sivasubramanian Sivalingam, Plano, TX (US); Steve Basra, Frisco, TX (US)

(73) Assignees: Toyota Motor North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 217 days.

(21) Appl. No.: 17/741,931

(22) Filed: May 11, 2022

(65) Prior Publication Data

US 2023/0366688 A1    Nov. 16, 2023

(51) Int. Cl.
*G01C 21/34* (2006.01)
*G01C 21/36* (2006.01)
*G06Q 30/0207* (2023.01)

(52) U.S. Cl.
CPC ..... *G01C 21/3469* (2013.01); *G01C 21/3691* (2013.01); *G01C 21/3697* (2013.01); *G06Q 30/0207* (2013.01)

(58) Field of Classification Search
CPC ............ G01C 21/3469; G01C 21/3691; G01C 21/3697; G06Q 30/0207
See application file for complete search history.

(56) References Cited

U.S. PATENT DOCUMENTS

| | | | |
|---|---|---|---|
| 8,538,694 B2 | 9/2013 | Conway | |
| 8,942,919 B2 | 1/2015 | Uyeki et al. | |
| 10,852,737 B2 | 12/2020 | Szubbocsev | |
| 2014/0229255 A1* | 8/2014 | Scofield | G06Q 30/0207 705/14.1 |
| 2014/0304076 A1* | 10/2014 | Baca | H04W 4/029 705/14.58 |
| 2016/0318515 A1* | 11/2016 | Laur | B60W 30/18154 |

(Continued)

FOREIGN PATENT DOCUMENTS

| | | | | |
|---|---|---|---|---|
| EP | 2689982 A1 * | 4/2014 | | B60L 15/2045 |

OTHER PUBLICATIONS

Dr. Kottilingam; "A Dynamic Routing Model for Hybrid Electric Vehicles"; Journal of Eletrical Engineering and Autmation; vol. 01/No. 01; ppl 50-57; Jan. 6, 2019; (https://irojournals.com/iroeea/V1/11/06.pdf).

(Continued)

*Primary Examiner* — Rami Khatib
(74) *Attorney, Agent, or Firm* — Dinsmore & Shohl LLP

(57) ABSTRACT

In accordance with one embodiment of the present disclosure, a method includes receiving, by a processor, a current location of a vehicle, a destination location, and a routing plan having a routing factor and a reward arrangement, planning, by the processor, a planned route from the current location to the destination location based on the routing factor of the routing plan, providing a direction to travel from the current location to the destination location via the planned route, determining a level of adherence based on a comparison of the planned route and an actual route on which the vehicle actually travels, and providing a reward based on the level of adherence and the reward arrangement.

19 Claims, 7 Drawing Sheets

(56)  References Cited

U.S. PATENT DOCUMENTS

| | | | | |
|---|---|---|---|---|
| 2017/0193614 A1* | 7/2017 | Kalyanaraman | ....... | G06Q 50/14 |
| 2018/0003516 A1* | 1/2018 | Khasis | ................... | G08G 1/207 |
| 2019/0120654 A1* | 4/2019 | Todasco | ............. | G01C 21/3667 |
| 2019/0383627 A1* | 12/2019 | Nangeroni | ........ | B60W 50/0098 |
| 2020/0072627 A1 | 3/2020 | Jung et al. | | |
| 2020/0294405 A1* | 9/2020 | Foltan | ...................... | G08G 5/34 |
| 2021/0018324 A1 | 1/2021 | Sujan et al. | | |
| 2021/0131812 A1 | 5/2021 | Gong et al. | | |
| 2023/0169837 A1* | 6/2023 | Madden | ........... | G08B 13/19684 |
| | | | | 340/541 |

OTHER PUBLICATIONS

Wenjuan Zhou, et al.; "The Energy-Efficient Dynamic Route Planning for Electric Vehicles"; vol. 2019/Article ID 2607402; 25 pgs.; Aug. 26, 2019; (https://www.hindawi.com/journals/jat/2019/2607402/).

* cited by examiner

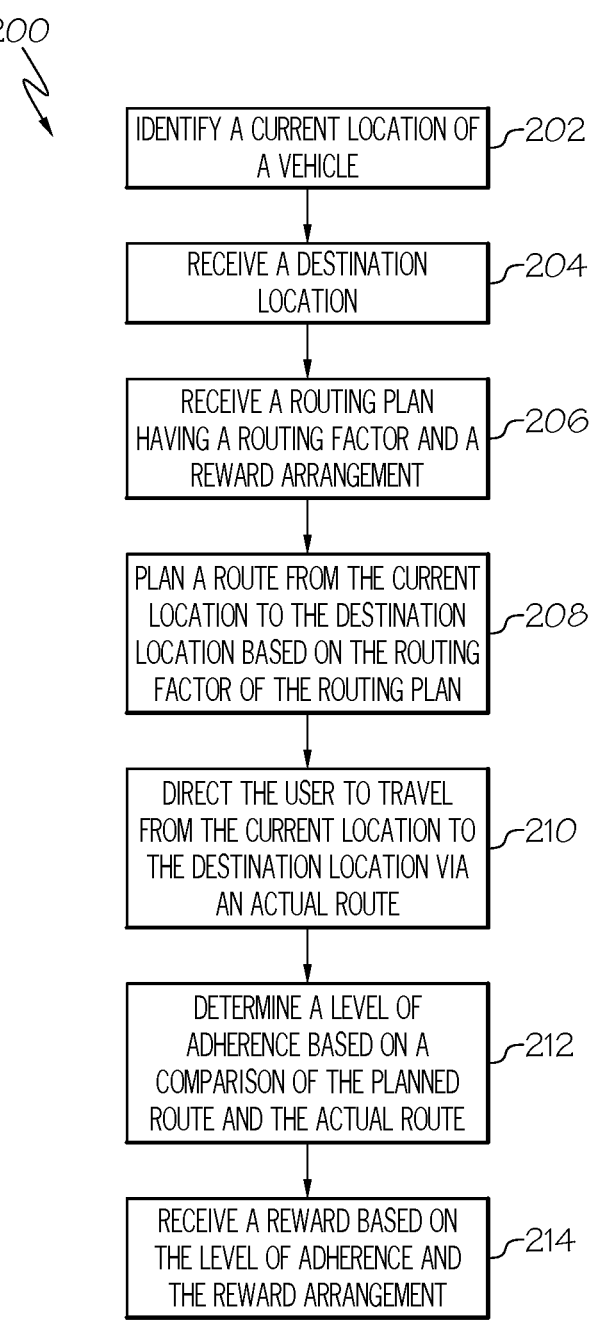

*200*

IDENTIFY A CURRENT LOCATION OF A VEHICLE ⌐*202*

RECEIVE A DESTINATION LOCATION ⌐*204*

RECEIVE A ROUTING PLAN HAVING A ROUTING FACTOR AND A REWARD ARRANGEMENT ⌐*206*

PLAN A ROUTE FROM THE CURRENT LOCATION TO THE DESTINATION LOCATION BASED ON THE ROUTING FACTOR OF THE ROUTING PLAN ⌐*208*

DIRECT THE USER TO TRAVEL FROM THE CURRENT LOCATION TO THE DESTINATION LOCATION VIA AN ACTUAL ROUTE ⌐*210*

DETERMINE A LEVEL OF ADHERENCE BASED ON A COMPARISON OF THE PLANNED ROUTE AND THE ACTUAL ROUTE ⌐*212*

RECEIVE A REWARD BASED ON THE LEVEL OF ADHERENCE AND THE REWARD ARRANGEMENT ⌐*214*

Wrigley Field

306

Willis Tower, 233 S Wacker Dr, Chicago, IL

Routing plan

308

Wrigley Field 27 min
7.7 miles 20 min
7.8 miles

402

Willis Tower

Go

404

600

QUERY THE PROVIDER FOR AN AGREEMENT — 602

RECEIVE THE ROUTING PLAN HAVING THE ROUTING FACTOR AND THE REWARD ARRANGEMENT BASED ON THE AGREEMENT FOR THE ROUTING PLAN — 604

RECEIVE AN ASSENT TO THE AGREEMENT — 606

TRANSMITTING THE ASSENT TO THE PROVIDER — 608

METHODS, SYSTEMS, AND VEHICLES FOR DYNAMIC ROUTING

TECHNICAL FIELD

The present disclosure relates to vehicle routing and, more particularly, to incentive-based vehicle routing.

BACKGROUND

Vehicles may often be routed according to a user's needs, such as distance and/or time requirements. Although the user cannot be forced to follow the route, the user is likely to follow the route because it directly benefits the user by satisfying the user's needs. Routing may also have broader benefits beyond the user's needs, such as traffic density reduction, noise reduction, pollution reduction, maximizing energy conservation, along with other benefits. However, it may be difficult to get the user to follow the route as it may not benefit the user, and in some cases, it might be detrimental to the user. Therefore, intelligent strategies for dynamic routing that incentivize users to follow routes are desired.

SUMMARY

In accordance with one embodiment of the present disclosure, a method includes receiving, by a processor, a current location of a vehicle, a destination location, and a routing plan having a routing factor and a reward arrangement, planning, by the processor, a planned route from the current location to the destination location based on the routing factor of the routing plan, providing a direction to travel from the current location to the destination location via the planned route, determining a level of adherence based on a comparison of the planned route and an actual route on which the vehicle actually travels, and providing a reward based on the level of adherence and the reward arrangement.

In accordance with another embodiment of the present disclosure, a system includes a processor, and machine-readable instructions when executed by the processor, cause the processor to perform operations including receiving a current location of a vehicle, a destination location, and a routing plan having a routing factor and a reward arrangement, planning a planned route from the current location to the destination location based on the routing factor of the routing plan, providing a direction to travel from the current location to the destination location via the planned route, determining a level of adherence based on a comparison of the planned route and an actual route on which the vehicle actually travels, and providing a reward based on the level of adherence and the reward arrangement.

In accordance with yet another embodiment of the present disclosure, a vehicle includes a processor, and machine-readable instructions, when executed by the processor, cause the processor to perform operations including receiving a current location of a vehicle, a destination location, and a routing plan having a routing factor and a reward arrangement, planning a planned route from the current location to the destination location based on the routing factor of the routing plan, providing a direction to travel from the current location to the destination location via the planned route, determining a level of adherence based on a comparison of the planned route and an actual route on which the vehicle actually travels, and providing a reward based on the level of adherence and the reward arrangement.

Although the concepts of the present disclosure are described herein with primary reference to user-driven automobiles, it is contemplated that the concepts will enjoy applicability to any vehicle, user-driven or autonomous. For example, and not by way of limitation, it is contemplated that the concepts of the present disclosure will enjoy applicability to autonomous automobiles.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 2 depicts a method for dynamic vehicle routing carried out by the system of FIG. 1, according to one or more embodiments shown and described herein;

DETAILED DESCRIPTION

The embodiments disclosed herein include methods, systems, and vehicles for dynamic routing. Embodiments may route vehicles to provide broader benefits beyond the user's needs, such as energy conservation, traffic density reduction, noise reduction, pollution reduction, along with other benefits. However, it may be difficult to get the user to follow the route as it may not benefit the user, and in some cases, it might be detrimental to the user. To encourage the user to follow the route generated, embodiments may provide an incentive framework for the user. The incentive framework may be a direct benefit that the user may receive based on the user's adherence to the framework.

Figure 1:
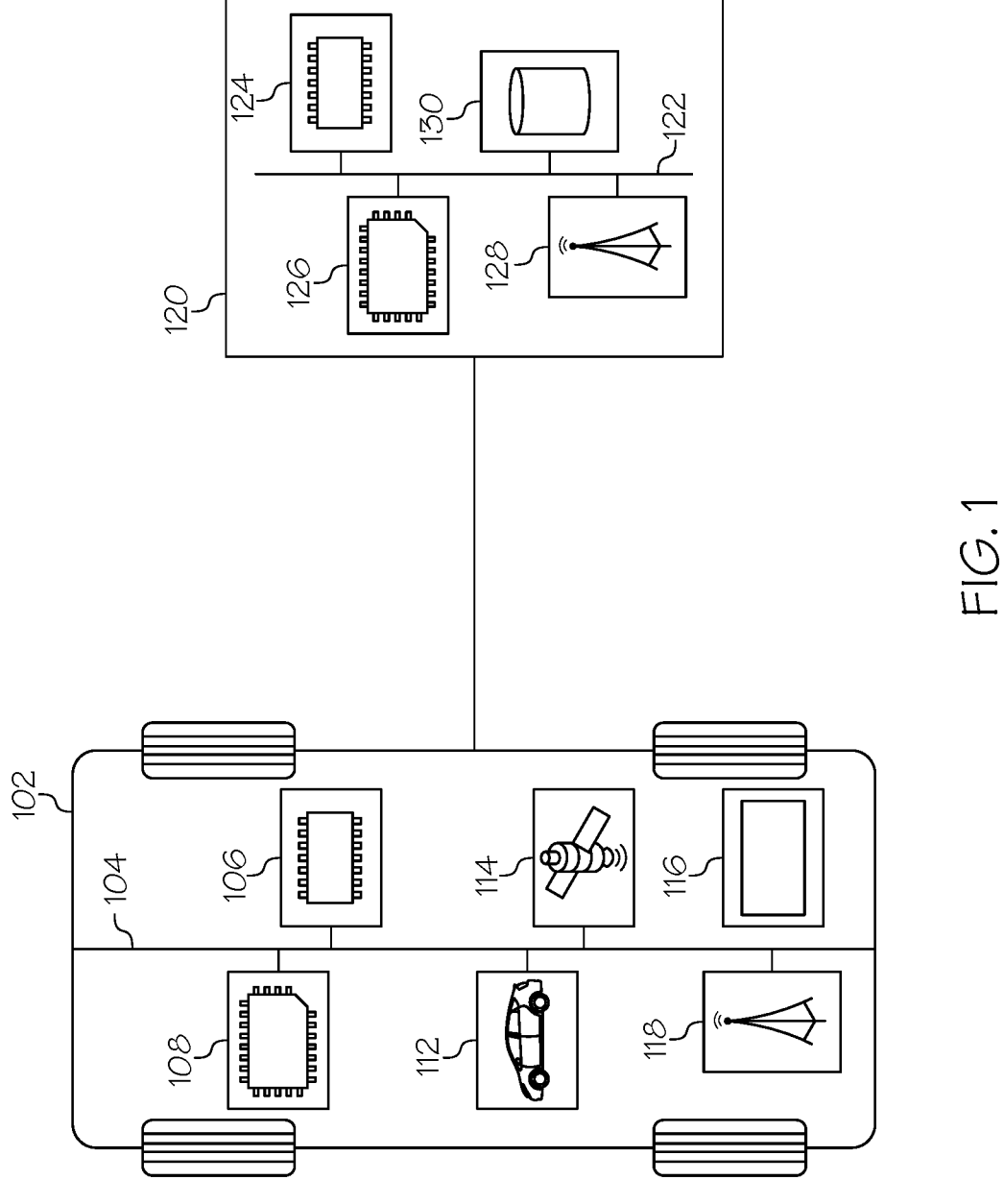
FIG. 1 depicts a system for dynamic vehicle routing, according to one or more embodiments shown and described herein.

Referring now to FIG. 1, a system 100 for dynamic vehicle routing is depicted. The system 100 may comprise a vehicle 102 and/or a server 120. The vehicle 102 may also be a device that may be placed onboard the vehicle 102. The vehicle 102 may be a connected vehicle and may include a processor 108, a memory 106, a driving assist module 112, a network interface 118, a location module 114, and an input/output interface (I/O interface 116). The vehicle 102 also may include a communication path 104 that communicatively connects the various components of the vehicle 102.

The processor 108 may include one or more processors that may be any device capable of executing machine-readable and executable instructions. Accordingly, each of the one or more processors of the processor 108 may be a controller, an integrated circuit, a microchip, or any other computing device. The processor 108 is coupled to the communication path 104 that provides signal connectivity between the various components of the connected vehicle.

Accordingly, the communication path 104 may communicatively couple any number of processors of the processor 108 with one another and allow them to operate in a distributed computing environment. Specifically, each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth®, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 106 is coupled to the communication path 104 and may contain one or more memory modules comprising RAM, ROM, flash memories, hard drives, or any device capable of storing machine-readable and executable instructions such that the machine-readable and executable instructions can be accessed by the processor 108. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory 106. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented on any conventional computer programming language, as pre-programmed hardware elements, or as a combination of hardware and software components.

The vehicle 102 may also include a driving assist module 112. The data gathered by the driving assist module 112 may be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The driving assist module 112 may also generate routes for the vehicle 102, which may generate routes according to factors outlined by a routing plan. Routing plans may be created by a service provider such as a vehicle fleet manager (e.g., busses and cabs), rideshare provider, mapping service, or any other provider of vehicle services. Service providers may create routing plans to direct how vehicles are routed, track vehicles' adherence to routes, and determine and/or deliver an incentive based on the vehicle's adherence.

The vehicle 102 also comprises a network interface 118 that includes hardware for communicatively coupling the vehicle 102 to the server 120. The network interface 118 can be communicatively coupled to the communication path 104 and can be any device capable of transmitting and/or receiving data via a network or other communication mechanisms. Accordingly, the network interface 118 can include a communication transceiver for sending and/or receiving any wired or wireless communication. For example, the hardware of the network interface 118 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle 102 may connect with one or more other connected vehicles and/or external processing devices (e.g., the server 120) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A location module 114 is coupled to the communication path 104 such that the communication path 104 communicatively couples the location module 114 to other modules of the vehicle 102. The location module 114 may comprise one or more antennas configured to receive signals from global positioning system (GPS) satellites. Specifically, in one embodiment, the location module 114 includes one or more conductive elements that interact with electromagnetic signals transmitted by GPS satellites. The received signal is transformed into a data signal indicative of the location (e.g., latitude and longitude) of the location module 114, and consequently, the vehicle 102.

The vehicle 102 may also include an I/O interface 116. The I/O interface 116 may allow for data to be presented to a human driver and for data to be received from the driver. For example, the I/O interface 116 may include a screen to display information to a user, speakers to present audio information to the user, and a touch screen that may be used by the user to input information. The interface may output information that the vehicle 102 received from the server 120. For example, the I/O interface 116 may display instructions to follow a route generated by the server 120, such as turn-by-turn instructions.

In some embodiments, the vehicle 102 may be communicatively coupled to the server 120 by a network via the network interface 118. The network may be a wide area network, a local area network, a personal area network, a cellular network, a satellite network, and the like.

The server 120 comprises a processor 126, a memory component 124, a network interface 128, a data storage component 130, and a communication path 122. Each server 120 component is similar in features to its connected vehicle counterpart, described in detail above. It should be understood that the components illustrated in FIG. 1 are merely illustrative and are not intended to limit the scope of this disclosure. More specifically, while the components in FIG. 1 are illustrated as residing within vehicle 102, this is a non-limiting example. In some embodiments, one or more of the components may reside external to vehicle 102, such as with the server 120.

Referring now to FIG. 2, a flowchart of a method 200 for dynamic vehicle routing is depicted. The method 200 may be carried out by the vehicle 102 of FIG. 1. The memory 106 of the vehicle 102 may store machine-readable instructions that, when executed by the processor 108, may cause the processor 108 to perform steps of the method 200. It should be understood that the method 200 may also or instead be performed by a server 120 of FIG. 1 or any other computing device.

At step 202, the vehicle 102 identifies a current location of the vehicle 102. The current location of the vehicle 102 may be identified with, for example, a location module 114 onboard the vehicle 102. For example, the vehicle 102 may have a GPS device for determining the latitude and longitude of the vehicle 102. The current location may also or instead be identified with a mobile device of the user. For example, the current location may be determined by triangulating the mobile device with cellular signals in range of the mobile device. The current location allows the system 100 to determine a starting point for vehicle routing as well as available routing plans. For example, the vehicle 102 may be part of a rideshare fleet that utilizes the current location of the vehicle 102 to determine where the vehicle 102 is to be routed as well as the routing plans available.

At step 204, the vehicle 102 receives a destination location. The destination location is a location that the vehicle 102 is planning on driving to from the current location. The destination location may be received from the user. For example, the user may enter a destination location into the system 100 by an I/O interface 116, such as a touchscreen of a navigation system. The destination location may also or instead be received from a computing device. For example, the user's mobile device may store a schedule of the user, and a location corresponding to an entry of the schedule may be automatically input to the system 100 as a destination location for the system 100 to navigate the vehicle 102.

At step 206, the vehicle 102 receives a routing plan having a routing factor and a reward arrangement from a provider. The provider may be a manager of the vehicle 102, such as a fleet manager, a rideshare coordinator, a dispatcher, and/or any other kind of entity that exerts influence over the traveling of the vehicle 102. The provider may manage its operations via one or more computing devices, such as the server 120. Management of vehicles may be according to one or more routing plans. A routing plan may contain instructions on how a vehicle 102 is to be routed from its current location to a destination location. The routing plan includes one or more routing factors and/or one or more reward arrangements. A routing factor is a factor that influences how routes are generated. For example, routing factors may include battery charge needed for regions limited to electric vehicles, traffic conditions, construction conditions, congestion conditions, weather conditions, road conditions, driver behavior, driver preferences, desired efficiency, noise ordinances, and the like. In some embodiments, the routing factor is to further a particular goal. For example, goals may include maximizing energy saved, minimizing infrastructure wear, minimizing noise pollution, and/or any other vehicle-related goals. A reward arrangement is an incentive structure for encouraging users to drive along the route generated according to the routing factors of the routing plan. For example, a reward arrangement may include money, discounts, and/or credits for tolls, parking, congestion fees, vehicle chargers, and other vehicle-related infrastructure as well as privileged access to aspects of vehicle-related infrastructure such as fast lanes, higher speed limits, and the like. The routing plan may be received from an external device, such as the server 120, owned by the provider. The routing plan may also or instead be generated onboard the vehicle 102 if the provider is the manufacturer of the vehicle 102, for example.

At step 208, one or more routes may be planned for the vehicle 102. The route may be from the current location to the destination location determined at steps 202 and 204, respectively. The route may be generated by the vehicle 102 and/or the server 120. The route may be based on the one or more routing factors of the one or more routing plans of step 206. For example, ordinary navigation systems may generate a route based on the earliest arrival time, but embodiments of the present application may generate routes that may save the most electricity by avoiding areas of stop-and-go traffic, targeting downhill roadways to take advantage of regenerative braking, and/or implementing other strategies for maximizing energy saved when the vehicle 102 arrives at the destination location. Planning a route may be based on map information, roadway information, traffic information, driver information, weather information, and/or any other information that may impact the travel of the vehicle 102 from its current location to its destination location.

At step 210, the user may be directed to travel from the current location to the destination location. The vehicle 102 may have a screen on an I/O interface 116 to present a navigation UI to the user, which may be visual, audio, and/or the like. The navigation UI may include a map, turn-by-turn directions, and/or the like. Although the user may be presented with a route generated according to the one or more routing factors of the one or more routing plans of step 206, the user may not always follow the planned route. The route the user chooses to travel may be considered an actual route, whereas the route planned in step 208 may be considered the planned route. Differences between the actual route and the planned route may be displayed on the navigation UI for the user to be aware. The vehicle 102 and/or the server 120 may redirect the user back to the planned route if the actual route diverges from the planned route. In embodiments, the vehicle 102 may be a smart vehicle (e.g., autonomous vehicle, semi-autonomous vehicle, self-driving car, or the like) that may travel based on the direction provided. For example, the vehicle 102 may travel along the planned route. A user may have an ability to override the vehicle 102 to deviate from the planned route. Differences between the actual route actually traveled by the vehicle 102 and the planned route may be displayed on the navigation UI for the user to be aware. The vehicle 102 and/or the server 120 may redirect the vehicle 102 back to the planned route if the actual route diverges from the planned route.

At step 212, a user's level of adherence to the planned route is determined. The level of adherence may be based on a comparison of the planned route and the actual route and may be expressed as a function of time and/or distance. The duration driven while the vehicle 102 was not on the planned route and/or the distance driven while the vehicle 102 was not on the planned route may reduce the level of adherence to the planned route. For example, if the planned route is ten miles and the user took the vehicle 102 on a two-mile detour, the vehicle 102 may determine that the level of adherence was only 80%. The level of adherence of the user to the planned route may be determined in real-time as the user is driving or after the user has completed the trip to the destination location. In some embodiments, the level of adherence may be a binary determination (i.e., adhered to or not adhered to).

At step 214, a reward may be received. The user may receive a reward based on the level of adherence and the reward arrangement. The reward is based on the level of adherence because it acts as an incentive for the user to drive along the planned route, which may be a route that the user may not normally drive. The reward arrangement is part of the routing plan from the provider and outlines the incentive structure for the user. The reward may come from the provider and/or someone other than the provider as arranged by the provider. For example, the provider may be a rideshare company that develops the routing plan but offers rewards from a third party, such as the city in which the rideshare company operates. Rewards may include financial and/or driving incentives such as reduced infrastructure fees (e.g., tolls and congestion charges), higher speed limits, and/or the like. In some embodiments, the reward arrangement may also or instead include penalties. Penalties may include financial and/or driving deterrents such as fines, reduced speed limits, and/or the like.

Figure 3:
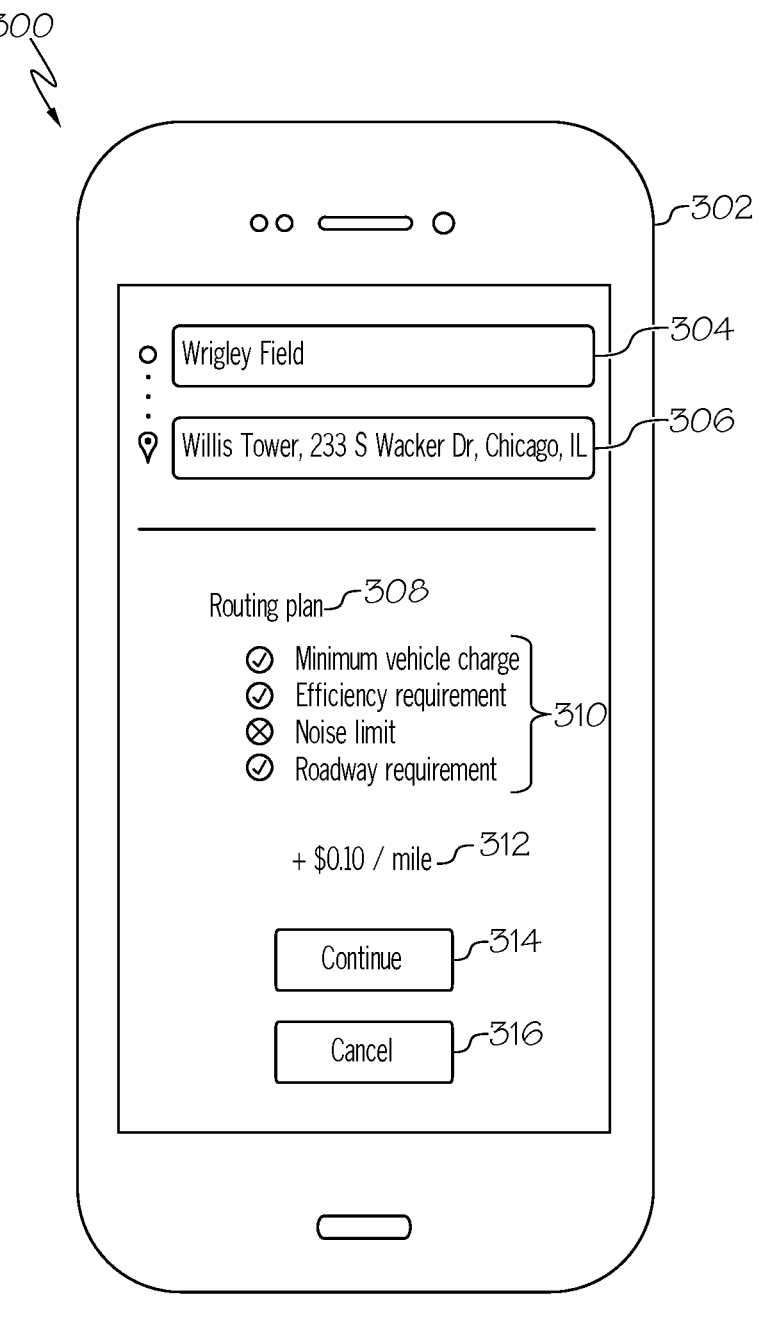
FIG. 3 depicts a user interface (UI) for routing plan requirements, according to one or more embodiments shown and described herein.

Referring now to FIG. 3, a UI 300 for routing plan 308 requirements is depicted. The UI 300 may be displayed on an electronic device 302. The electronic device 302 is a mobile device, as shown in FIG. 3. In some embodiments, the electronic device 302 may be an I/O module of a vehicle 102 (e.g., I/O interface 116). The electronic device 302 may have a screen for displaying a routing plan 308. For example, here, the electronic device 302 presents a routing plan 308 entitled "routing plan." The requirements of the routing plan 308 may be listed along with the title of the routing plan 308. Routing plan 308 requirements may include components as discussed with regard to step 206 of FIG. 2 above. For example, referring still to FIG. 3, the requirements of routing plan 308 may be routing factors 310, including an indication of a minimum vehicle 102 charge requirement (e.g., at least 30% charge required), a vehicle efficiency requirement (e.g., regenerative braking required), a noise limit (e.g., <70 dB), and a roadway requirement (e.g., prefer road A over road B). Routing factors 310 may also include weather conditions, traffic conditions, road conditions, battery charge, energy consumption, vehicle 102 noise, and/or vehicle 102 weight. It should be understood that the routing factors 310 are not limited to those as shown and described herein but may include any other factors related to driving and/or routing of vehicles. As another example, the UI 300 may also include the reward arrangement 312 of the routing plan 308. Here, the reward arrangement 312 may include financial compensation of $0.10 per mile driven along the route planned by the routing plan 308. The user may indicate an assent to the routing plan 308 by pressing the "Continue" button 314 or a lack of assent by pressing the "Cancel" button 316.

Figure 4:
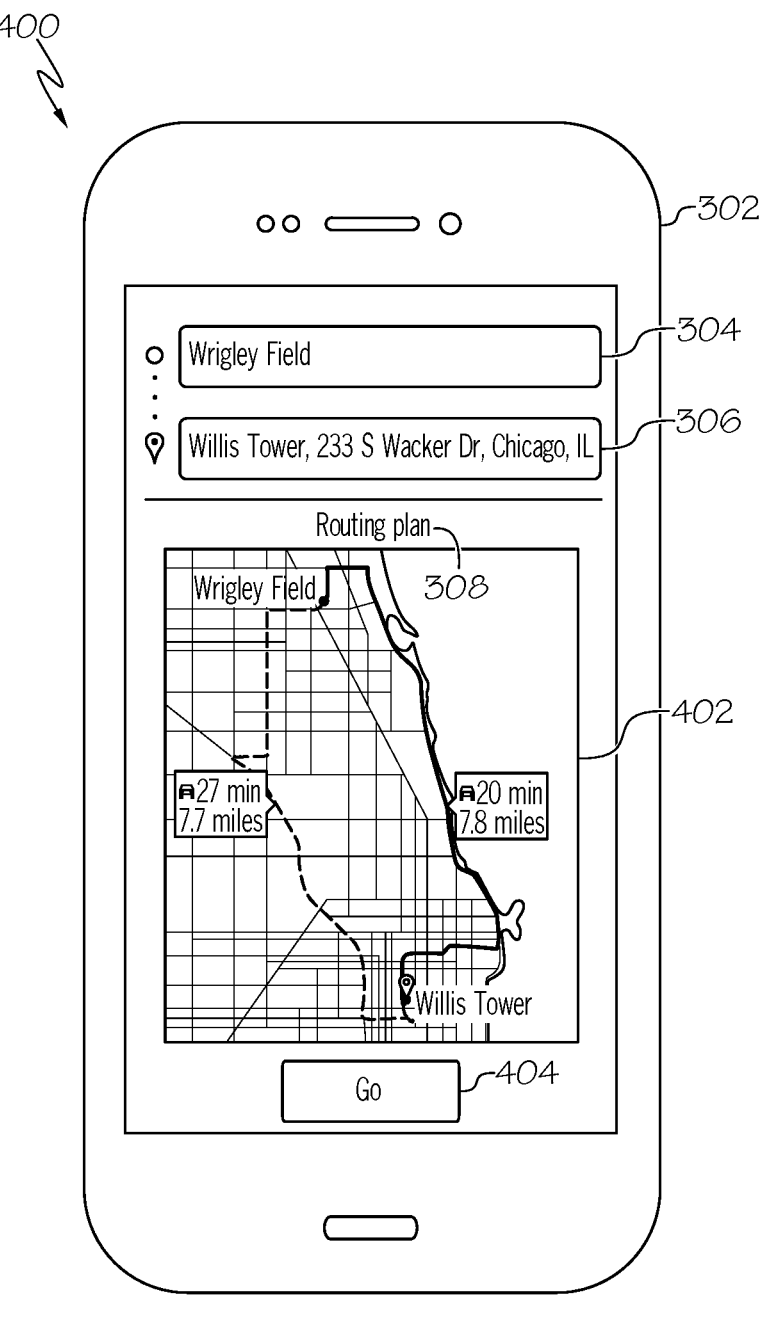
FIG. 4 depicts a UI for vehicle routing, according to one or more embodiments shown and described herein.

Referring now to FIG. 4, a UI 400 for vehicle 102 routing is depicted. The UI 400 may be displayed on an electronic device 302, which may have a screen for displaying the routing plan 308, in this case, entitled "routing plane." The electronic device 302, as non-limiting examples, may be a smart phone, a personal digital assistant (PDA), a navigation, or any device may be communicatively coupled to the vehicle 102 and/or the server 120. The routing plan 308 may utilize any existing or not yet existing routing algorithms to generate one or more routes 402 from a current location 304 to a destination location 306. The routing plan 308 may utilize its routing factors 310 to bias or otherwise alter the route generation such that the routing factors 310 are followed, minimized, maximized, or otherwise accounted for. For example, if the routing plan 308 requires that a vehicle 102 maximize energy savings, the routing plan 308 may generate a route 402 that has more downhill regions to maximize the vehicle's ability to coast and/or utilize regenerative braking, a route 402 that has fewer stops, a route 402 that has fewer turns, and/or the like. When the user indicates that he will begin driving, such as by pressing the "Go" button 404 on the UI 400, the electronic device 302 may begin tracking the vehicle's actual route. While tracking the actual route and/or after arriving at the destination location 306, the electronic device 302 may determine a level of adherence with the route 402. The electronic device 302 may compare the actual route with the generated route 402 to determine a level of adherence. For example, a level of adherence may be a percentage of the generated route 402 actually driven. The electronic device 302 may also or instead consider a degree of deviation from the routing factors 310 in determining a level of adherence. For example, a level of adherence may be a function of the percentage of the generated route 402 actually driven, the number of routing factors 310 satisfied by the vehicle 102, and/or the distance traveled by the vehicle 102 having satisfied the number of routing factors 310.

Figure 5:
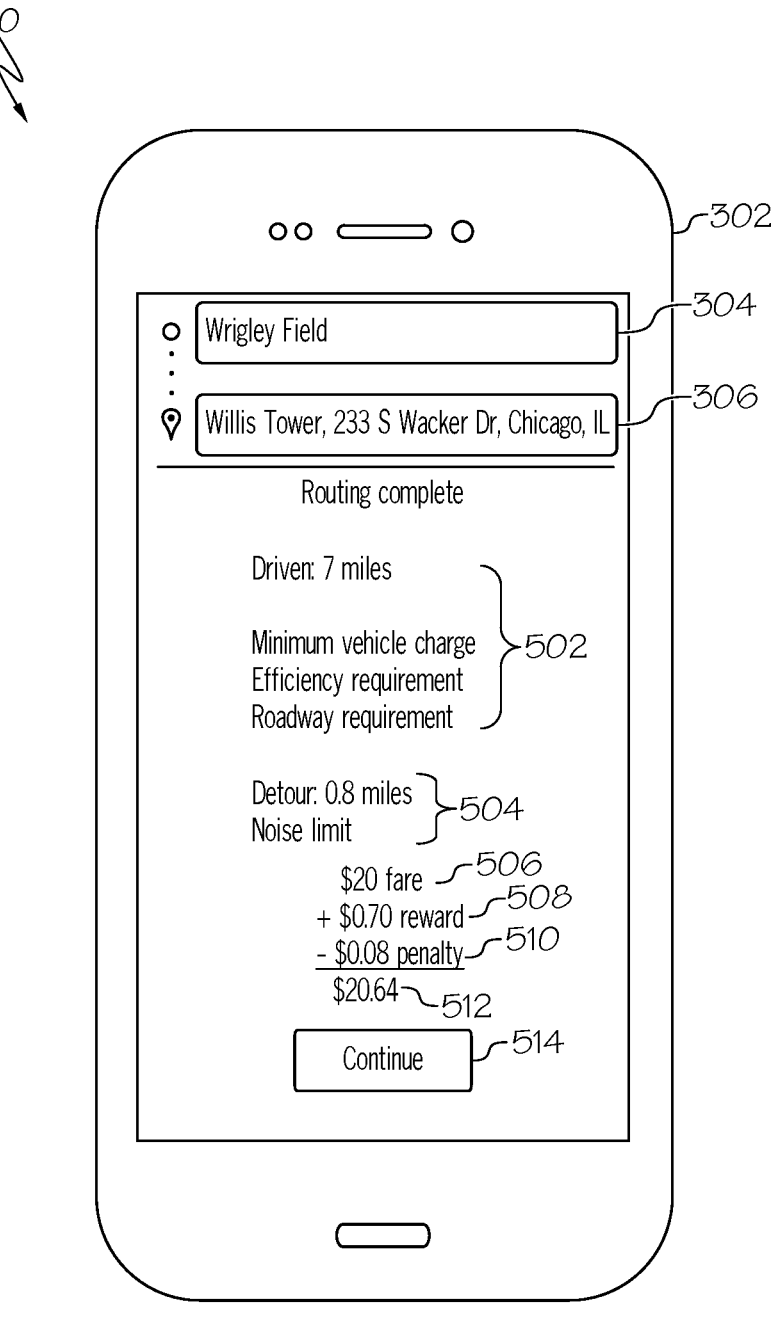
FIG. 5 depicts a UI for reward collecting, according to one or more embodiments shown and described herein.

Referring now to FIG. 5, a UI 500 for reward 508 collecting is depicted. After arriving at the destination location 306 from the current location 304, the electronic device 302 may present an analysis of the user's trip. The analysis may include the actual route traveled, the satisfied routing factors 502, the unsatisfied routing factors 504, the reward 508, and/or the penalty 510. The reward 508 may include a cash payment, a toll subsidy, an increased speed limit, a lane availability, and/or any other kind of benefit to the user. The reward 508 may be proportional to the level of adherence to the generated route 402. For example, the user may be driving from the current location 304 to the destination location 306 as part of a routing plan 308 provided by a rideshare provider. The user may receive a $20 fare 506 as part of the rideshare service, a $0.70 reward 508 for driving seven miles with the satisfied routing factors 502, and an $0.08 penalty 510 for driving 0.8 miles with the unsatisfied routing factors 504, for a total 512 of $20.62. The user may acknowledge the routing analysis by pressing the "Continue" button 514.

Figure 6:
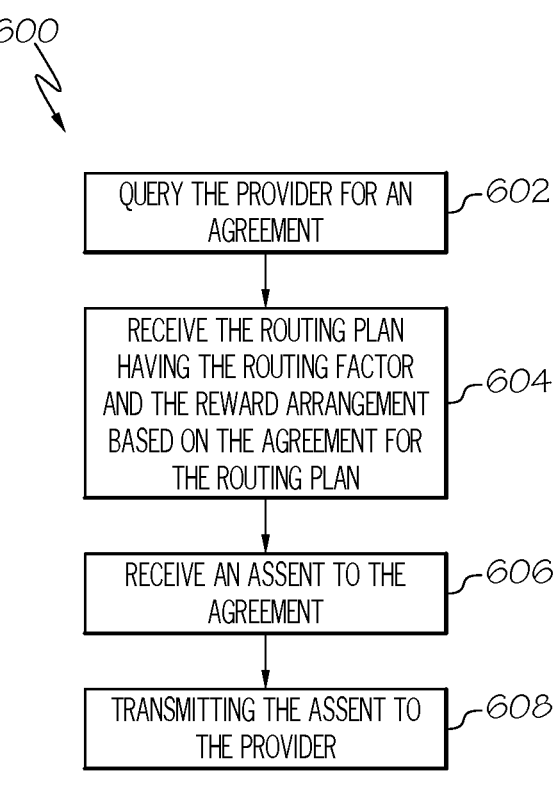
FIG. 6 depicts a method for selecting a routing plan, according to one or more embodiments shown and described herein.

Referring now to FIG. 6, a flowchart of a method 600 for selecting a routing plan is depicted. The method 600 may be carried out by the vehicle 102 of FIG. 1. The memory 106 of the vehicle 102 may store machine-readable instructions that, when executed by the processor 108, may cause the processor 108 to perform steps of the method 600. It should be understood that the method may also or instead be performed by a server 120 of FIG. 1 or any other computing device.

At step 602, the vehicle 102 may query the provider for an agreement. The provider may be a computer device that facilitates the organization and/or incentivizing of vehicle routing, such as a rideshare company, a vehicle OEM, and/or the like. The provider may operate a server, such as the server 120 of FIG. 1, that generates the agreement with the vehicle 102 in response to queries from the vehicle 102. The query may have the current location, the destination location, the characteristics of the vehicle 102, the information of the user, and/or the like.

At step 604, the vehicle 102 may receive an agreement from the provider. The agreement may include a routing plan for the user to adhere to. The routing plan may have a routing factor and/or a reward arrangement. For example, the agreement may indicate that the user will adhere to a routing plan with an emphasis on the routing factors in exchange for the reward arrangement. The user may have assented to the agreement in advance. For example, if the user is part of a rideshare fleet, the user may have agreed to adhere to routing plans upon joining the rideshare fleet. In some embodiments, the agreement may be in the form of an offer for the user to adhere to the routing plans. In which case, the process may proceed to step 606; otherwise, the process may end at step 604.

At step 606, the vehicle 102 may receive an assent to the agreement by the user. The user may provide an indication of assent, such as an oral indication, a written indication, or any other verbal indication. For example, the user may check a box on a form displayed on an electronic display indicating an assent and confirming his assent by completing the form.

At step 608, the vehicle 102 may send the assent to the agreement by the user. For example, the vehicle 102 may transmit a message via its network interface 118 to the network interface 128 of the server 120 of the provider. The provider may then receive from the user the assent to the agreement and begin planning a route and tracking the vehicle 102.

Figure 7:
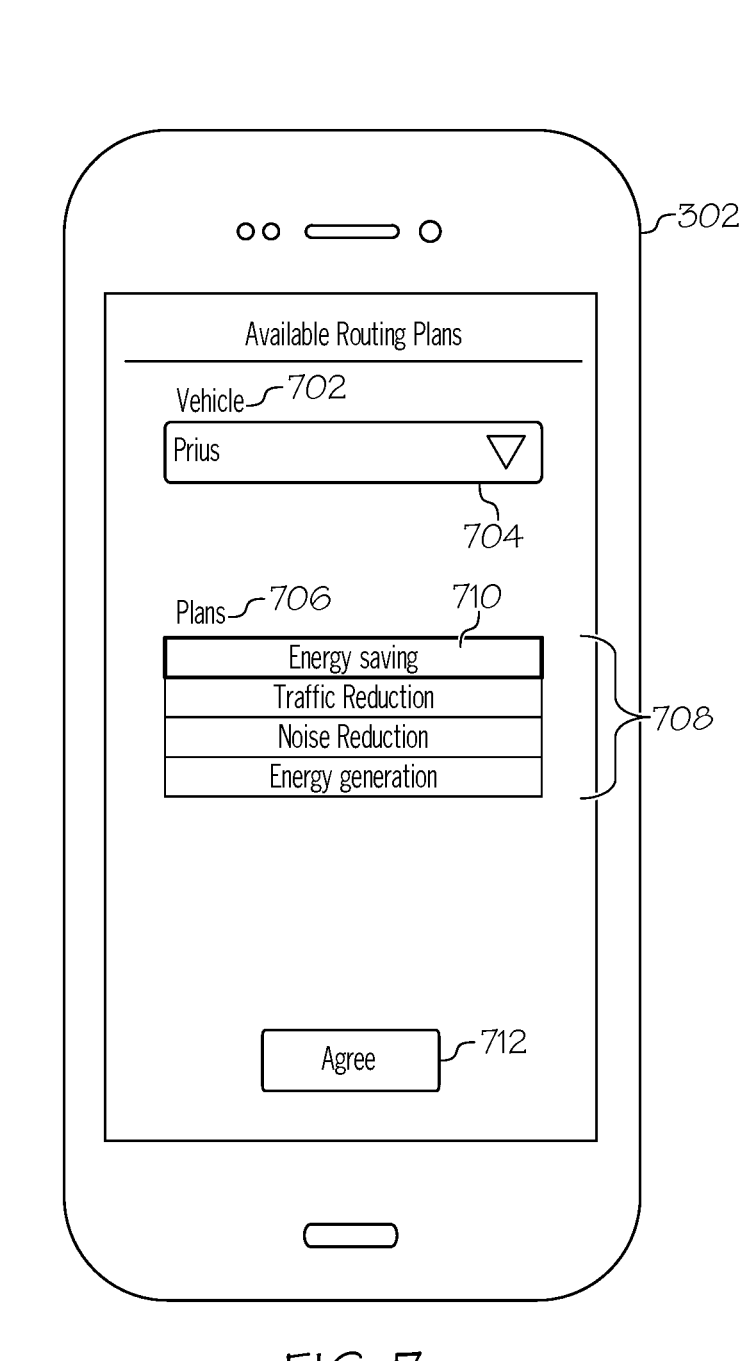
FIG. 7 depicts a UI for selecting a routing plan, according to one or more embodiments shown and described herein.

Referring now to FIG. 7, a UI 700 for selecting routing plans 708 is depicted. To view options of available routing plans 708, a server 120 of the provider may be queried according to step 602 of method 600. To provide information that may be included with the query, the UI 700 may include menu options for the user to enter information such as the current location, the destination location, the characteristics of the vehicle 102, the information of the user, and/or the like. For example, the UI 700 includes a "vehicle" form 702 having a dropdown input 704 for the user to select the model of the vehicle 102 that may then be sent to the server 120 of the provider. The UI 700 may display a list of agreements for the user to select from in response to the inputs sent to the server 120 via the query. For example, the UI 700 may populate the "plans" form 706 to display the available routing plans 708. The routing plans 708 may be named according to the routing plan, the routing factors, and/or the reward arrangement. The user may choose a selection 710 from the list of available routing plans 708. For example, the UI 700 has a selection 710 of the "energy saving" routing plan, which may indicate routing factors that require the vehicle 102 to be routed such that it has traveled to its destination minimizing the amount of energy used. The UI 700 may also include an interface element such as an "agree" button 712 to indicate an assent to the selection 710.

It should now be understood that the embodiments disclosed herein include methods, systems, and vehicles for dynamic routing. Embodiments may route vehicles to provide broader benefits beyond the user's needs, such as energy conservation, traffic density reduction, noise reduction, pollution reduction, along with other benefits. To encourage the user to follow the route generated, embodiments may provide an incentive framework for the user. The incentive framework may be a direct benefit that the user may receive based on the user's adherence to the framework.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
receiving, by a processor, a current location of a vehicle, a destination location, and a routing plan having a plurality of routing factors and a reward arrangement;

planning, by the processor, a planned route from the current location to the destination location based on the plurality of routing factors of the routing plan, wherein the plurality of routing factors influence generation of the planned route;

providing a direction to travel from the current location to the destination location via the planned route;

autonomously traveling, by the vehicle, along the planned route from the current location to the destination location in accordance with the direction to travel;

overriding, by a user, the vehicle to deviate from the planned route while it is autonomously traveling;

determining an actual route on which the vehicle actually travels;

determining a level of adherence based on a comparison of the planned route and the actual route as a function of a percentage of the planned route actually driven, a number of the plurality of routing factors satisfied by the vehicle, and a distance traveled by the vehicle having satisfied the number of the plurality of routing factors;

determining differences between the actual route and the planned route, wherein the differences between the actual route and the planned route are determined after the overriding by the user;

displaying, on a user interface, the differences between the actual route and the planned route;

redirecting the vehicle back to the planned route in response to the actual route diverging from the planned route; and providing a reward based on the level of adherence and the reward arrangement.

2. The method of claim 1, wherein receiving the routing plan comprises:

sending a query for an agreement, wherein the query has at least one of the current location and the destination location; and receiving the routing plan having the plurality of routing factors and the reward arrangement based on the agreement for the routing plan.

3. The method of claim 2, wherein receiving the routing plan further comprises:

receiving an assent to the agreement.

4. The method of claim 1, wherein the plurality of routing factors includes at least one of battery charge needed for regions limited to electric vehicles, weather conditions, traffic conditions, road conditions, energy consumption, vehicle noise, and vehicle weight.

5. The method of claim 1, wherein the level of adherence is further based on a degree of deviation from the plurality of routing factors.

6. The method of claim 1, wherein the reward received is proportional to the level of adherence.

7. The method of claim 1, further comprising providing a determination of the level of adherence in real-time that is expressed as a function of distance while the vehicle is being driven.

8. The method of claim 1, further comprising providing the reward based on satisfying the number of the plurality of routing factors for a first portion of the planned route less a penalty corresponding to not satisfying the number of the plurality of routing factors for a second portion of the planned route.

9. A system comprising:

a processor; and machine-readable instructions when executed by the processor, cause the processor to perform operations comprising:

receiving a current location of a vehicle, a destination location, and a routing plan having a plurality of routing factors and a reward arrangement;

planning a planned route from the current location to the destination location based on the plurality of routing factors of the routing plan, wherein the plurality of routing factors influence generation of the planned route;

providing a direction to travel from the current location to the destination location via the planned route;

autonomously traveling, by the vehicle, along the planned route from the current location to the destination location in accordance with the direction to travel;

overriding, by a user, the vehicle to deviate from the planned route while it is autonomously traveling;

determining an actual route on which the vehicle actually travels;

determining a level of adherence based on a comparison of the planned route and the actual route as a function of a percentage of the planned route actually driven, a number of the plurality of routing factors satisfied by the vehicle, and a distance traveled by the vehicle having satisfied the number of the plurality of routing factors;

determining differences between the actual route and the planned route, wherein the differences between the actual route and the planned route are determined after the overriding by the user;

displaying, on a user interface, the differences between the actual route and the planned route;

redirecting the vehicle back to the planned route in response to the actual route diverging from the planned route; and providing a reward based on the level of adherence and the reward arrangement.

10. The system of claim 9, wherein receiving the routing plan comprises:

sending a query for an agreement, wherein the query has at least one of the current location and the destination location; and receiving, the routing plan having the plurality of routing factors and the reward arrangement based on the agreement for the routing plan.

11. The system of claim 10, wherein receiving the routing plan further comprises:

receiving an assent to the agreement.

12. The system of claim 9, wherein the plurality of routing factors includes at least one of battery charge needed for regions limited to electric vehicles, weather conditions, traffic conditions, road conditions, energy consumption, vehicle noise, and vehicle weight.

13. The system of claim 9, wherein the level of adherence is further based on a degree of deviation from the plurality of routing factors.

14. The system of claim 9, wherein the reward received is proportional to the level of adherence.

15. A vehicle comprising:

a processor; and machine-readable instructions, when executed by the processor, cause the processor to perform operations comprising:

receiving a current location of the vehicle, a destination location, and a routing plan having a plurality of routing factors and a reward arrangement;

planning a planned route from the current location to the destination location based on the routing factor of the routing plan, wherein the plurality of routing factors influence generation of the planned route;

providing a direction to travel from the current location to the destination location via the planned route;

autonomously traveling, by the vehicle, along the planned route from the current location to the destination location in accordance with the direction to travel;

overriding, by a user, the vehicle to deviate from the planned route while it is autonomously traveling;

determining an actual route on which the vehicle actually travels;

determining a level of adherence based on a comparison of the planned route and the actual route as a function of a percentage of the planned route actually driven, a number of the plurality of routing factors satisfied by the vehicle, and a distance traveled by the vehicle having satisfied the number of the plurality of routing factors;

determining differences between the actual route and the planned route, wherein the differences between the actual route and the planned route are determined after the overriding by the user;

displaying, on a user interface, the differences between the actual route and the planned route;

redirecting the vehicle back to the planned route in response to the actual route diverging from the planned route; and providing a reward based on the level of adherence and the reward arrangement.

16. The vehicle of claim 15, wherein receiving the routing plan comprises:

sending a query for an agreement, wherein the query has at least one of the current location and the destination location; and receiving the routing plan having the plurality of routing factors and the reward arrangement based on the agreement for the routing plan.

17. The vehicle of claim 15, wherein the plurality of routing factors includes at least one of battery charge needed for regions limited to electric vehicles, weather conditions, traffic conditions, road conditions, energy consumption, vehicle noise, and vehicle weight.

18. The vehicle of claim 15, wherein the level of adherence is further based on a degree of deviation from the routing factor.

19. The vehicle of claim 15, wherein the reward received is proportional to the level of adherence.

* * * * *